United States Patent [19]

Miederer et al.

[11] 4,154,577
[45] May 15, 1979

[54] UNIFORMLY DISPERSE DYED WATER-SWELLABLE CELLULOSIC FIBERS

[75] Inventors: Peter Miederer; Johannes Dehnert, both of Ludwigshafen, Fed. Rep. of Germany

[73] Assignee: BASF Aktiengesellschaft, Ludwigshafen, Fed. Rep. of Germany

[21] Appl. No.: 891,840

[22] Filed: Mar. 30, 1978

[30] Foreign Application Priority Data

Apr. 16, 1977 [DE] Fed. Rep. of Germany ....... 2716934

[51] Int. Cl.² .............................................. C09B 27/00
[52] U.S. Cl. ...................................... 8/41 R; 8/21 C; 8/54.2; 8/93; 260/197
[58] Field of Search .................... 8/41 R, 21 C, 54.2, 8/93

[56] References Cited

U.S. PATENT DOCUMENTS

| 3,706,525 | 12/1972 | Blackwell et al. | 8/21 C |
| 3,711,245 | 1/1973 | Neumer | 8/21 R |
| 4,049,377 | 9/1977 | Schwab et al. | 8/21 C |

OTHER PUBLICATIONS

Venkataraman, K., "The Chemistry of Synthetic Dyes", vol. VIII (Academic Press), 1978, pp. 179–180.

Primary Examiner—A. Lionel Clingman
Attorney, Agent, or Firm—Oblon, Fisher, Spivak, McClelland & Maier

[57] ABSTRACT

Uniformly dyed water-swellable cellulosic fibers obtained by dyeing cellulosic fibers in the swollen state with a dye of the formula

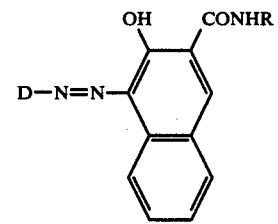

in which D is the radical of a diazo component and R is an aliphatic, cycloaliphatic or araliphatic radical. The fibers are eminently suitable as textile material.

7 Claims, No Drawings

UNIFORMLY DISPERSE DYED WATER-SWELLABLE CELLULOSIC FIBERS

The invention relates to uniformly dyed water-swellable cellulosic fibers which are fast to washing, drycleaning, sublimation and light and have been produced by contacting water-swellable cellulose fibers sequentially or concomitantly with water, ethylene glycol or a derivative thereof and, while the fibers are still swollen, an essentially water-insoluble dye of the formula I

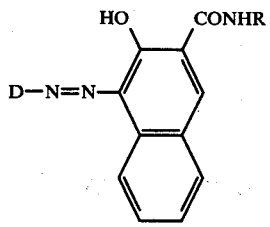

where D is the radical of a diazo component and R is an aliphatic, cycloaliphatic or araliphatic radical.

The diazo component $DNH_2$ is in the main derived from the benzene, azobenzene, naphthalene, anthraquinone, thiophene, thiazole, thiadiazole, benzthiazole, benzisothiazole, triazole, pyrazole or indazole series.

Examples of substituents of the radicals D of the diazo components are:

In the benzene series: chlorine, bromine, nitro, cyano, trifluoromethyl, methylsulfonyl, ethylsulfonyl, phenylsulfonyl, carbomethoxy, carbobutoxy, carbo-β-methoxyethoxy, carbo-β-hydroxyethoxy, unsubstituted, N-monosubstituted or N-disubstituted carboxylic acid amide or sulfonamide, methyl, ethyl, methoxy, ethoxy, 3-phenyl-1,2,4-oxdiazolyl and 3-alkyl-1,2,4-oxdiazolyl (where alkyl is of 1 to 4 carbon atoms).

Examples of N-substituents of the carboxylic acid amides or sulfonamides are methyl, ethyl, propyl, butyl, β-hydroxyethyl, γ-hydroxypropyl, β-methoxyethyl, γ-methoxypropyl, γ-ethoxypropyl, cyclohexyl, benzyl, phenoxyethoxypropyl or phenyl; the amide may also be a pyrrolidide, piperidide or morpholide.

In the azobenzene series: chlorine, bromine, nitro, cyano, methyl, hydroxyl, ethyl, methoxy and ethoxy.

In the heterocyclic series: chlorine, bromine, nitro, cyano, methyl, ethyl, phenyl, methoxy, ethoxy, methylmercapto, β-carbomethoxyethylmercapto, β-carboethoxyethylmercapto, carbomethoxy, carboethoxy, acetyl, methylsulfonyl and ethylsulfonyl.

Specifically, the radical D may be derived from, for example, the following amines: aniline, o-, m- and p-toluidine, o-, m- and p-nitroaniline, o-, m- and p-cyanoaniline, 2,4-dicyanoaniline, o-, m- and p-chloroaniline, o-, m- and p-bromoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 4-methyl-2-nitroaniline, 2-methoxy-4-nitroaniline, 4-chloro-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic acid n-butylamide and β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,4-dinitrobenzene-6-carboxylic acid methyl ester and β-methoxyethyl ester, 3,5-dichloroanthranilic acid propyl ester, 3,5-dibromoanthranilic acid β-methoxyethyl ester, N-acetyl-p-phenylenediamine, 4-aminoacetophenone, 4- and 2-aminobenzophenone, 2- and 4-aminodiphenylsulfone, 2-, 3- and 4-aminobenzoic acid methyl ester, ethyl ester, propyl ester, butyl ester, isobutyl ester, β-methoxyethyl ester, β-ethoxyethyl ester, methyldiglycol ester, ethyldiglycol ester, methyltriglycol ester, ethyltriglycol ester, β-hydroxyethyl ester, β-acetoxyethyl ester, β-(β'-hydroxyethoxy)-ethyl ester, β-hydroxypropyl ester, γ-hydroxypropyl ester, ω-hydroxybutyl ester and ω-hydroxyhexyl ester, 5-nitroanthranilic acid methyl ester, isobutyl ester, methyldiglycol ester, β-methoxyethyl ester, β-butoxyethyl ester and β-acetoxyethyl ester, the dimethyl, diethyl, dipropyl and dibutyl esters of 3- and 4-aminophthalic acid, 5-aminoisophthalic acid and aminoterephthalic acid, 3- and 4-aminobenzoic acid amide, methylamide, propylamide, butylamide, isobutylamide, cyclohexylamide, β-ethylhexylamide, γ-methoxypropylamide and γ-ethoxypropylamide, 2-, 3- and 4-aminobenzoic acid dimethylamide, diethylamide, pyrrolidide and morpholide, N-methyl-N-β-hydroxy-ethylamide, 5-aminoisophthalic acid diamide and bis-γ-methoxypropylamide, aminoterephthalic acid bis-diethylamide, 3- and 4-aminophthalimide, 3- and 4-aminophthalic acid β-hydroxyethylamide and γ-hydroxypropylamide, 3-amino-6-nitrophthalic acid β-hydroxyethylamide, 2-, 3- and 4-aminobenzenesulfonic acid dimethylamide, diethylamide, pyrrolidide and morpholide, methylsulfonic acid 2'-, 3'- and 4'-aminophenyl ester, ethylsulfonic acid 2'-, 3'- and 4'-aminophenyl ester, butylsulfonic acid 2'-, 3'- and 4'-aminophenyl ester, benzenesulfonic acid 2'-, 3'- and 4'-aminophenyl ester, 1- and 2-aminoanthraquinone, 1-amino-4-chloroanthraquinone, 3- and 4-aminodiphenylene oxide, 2-aminobenzthiazole, 2-amino-6-(carboxylic acid methyl ester)-benzthiazole, 2-amino-6-methylsulfonyl-benzthiazole, 2-amino-6-cyanobenzthiazole, 2-amino-6-nitrobenzthiazole, 5,6- and 6,7-dichloro-2-aminobenzthiazole, 4-amino-5-bromo-7-nitro-1,2-benzisothiazole, 3-amino-5-nitro-2,1-benzisothiazole, 3-amino-5-nitro-7-bromo-2,1-benzisothiazole, 2-aminothiazole, 2-amino-5-nitrothiazole, 2-amino-4-methyl-thiazole-5-carboxylic acid ethyl ester, 2-amino-4-methyl-5-acetylthiazole, 2-amino-3-cyano-4-methyl-thiophene-5-carboxylic acid esters with $C_1$ to $C_4$ alkanols, 2-phenyl-5-amino-1,3,4-thiadiazole, 3-methylmercapto-5-amino-1,2,4-thiadiazole and 3-β-carbomethoxy-ethylmercapto-5-amino-1,2,4-thiadiazole.

Examples of suitable diazo components of the aminoazobenzene series are 4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3-dichloro-4- aminoazobenzene, 3-methoxy-4-aminoazobenzene, 4'-hydroxy-2'-methyl-4-aminoazobenzene and 3-chloro-4-aminoazobenzene.

Examples of suitable radicals R are the following substituents: alkyl of 1 to 18 carbon atoms, alkyl of 2 to 8 carbon atoms substituted by hydroxyl, cyano, alkoxy of 1 to 8 carbon atoms, cyclohexyl, phenoxy, phenoxyethoxy or benzyloxy, cyclohexyl, norbornyl, benzyl, phenylethyl, phenylhydroxyethyl, phenylpropyl, phenylbutyl, polyalkoxyalkyl of 5 to 12 carbon atoms, hydroxypolyalkoxyalkyl of 4 to 9 carbon atoms, alkanoyloxyalkyl (where alkanoyloxy is of 1 to 8 carbon atoms and alkyl is of 2 to 6 carbon atoms), aroyloxyalkyl (where aroyloxy is of 7 to 11 carbon atoms and alkyl is of 2 to 6 carbon atoms), alkylaminocarbonyloxyalkyl (where alkylamino is of 1 to 8 carbon atoms and alkyl is of 2 to 6 carbon atoms), arylaminocarbonyloxyalkyl (where aryl is of 6 to 10 carbon atoms and alkyl is of 2 to 6 carbon atoms), alkoxycarbonylalkyl (where alkoxy is of 1 to 8 carbon atoms and alkyl is of 2 to 7 carbon atoms), alkanoyl of 1 to 18 carbon atoms, aralkanoyl of 8 to 10 carbon atoms, aroyl of 7 to 11 carbon atoms, alkylsulfonyl of 1 to 4 carbon atoms and arylsulfonyl of 6 to 10 carbon atoms.

Specific examples of radicals R, in addition to those already mentioned, are:

1. Unsubstituted or substituted alkyl:
$CH_3$, $C_2H_5$, n- and i-$C_3H_7$, n- and i-$C_4H_9$, $C_6H_{13}$,

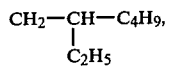

$CH_2CH_2OH$, $(CH_2)_3OH$,

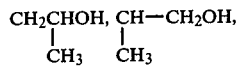

$(CH_2)_4OH$, $(CH_2)_6OH$,

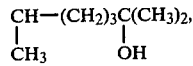

$(CH_2)_2O(CH_2)_2OH$, $(CH_2)_3O(CH_2)_4OH$, $(CH_2)_3O(CH_2)_2OH$, $(CH_2)_2CN$, $(CH_2)_5CN$, $(CH_2)_6CN$, $(CH_2)_7CN$, $(CH_2)_2O(CH_2)_2CN$, $(CH_2)_3O(CH_2)_2CN$, $(CH_2)_2O(CH_2)_2O(CH_2)_2CN$, $(CH_2)_3OC_2H_4OCH_3$, $(CH_2)_3OC_2H_4OC_2H_5$, $(CH_2)_3O(CH_2)_6OH$, $(CH_2)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

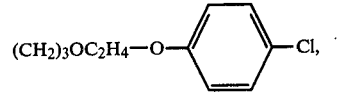

—$(CH_2)_3O(CH_2)_2O(CH_2)_2OC_6H_5$,

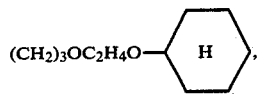

$(CH_2)_3OC_2H_4OC_6H_5$,

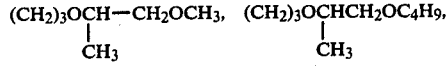

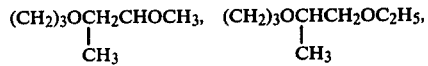

$CH_2CH_2COOH$, $(CH_2)_5COOH$, $(CH_2)_6COOH$, the corresponding radicals in which the groups —$O(CH_2)_2$—,

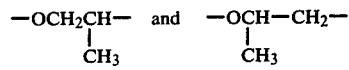

occur two or three times, as well as $CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$,

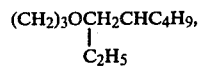

$(CH_2)_3OC_6H_{13}$, $(CH_2)_3OC_8H_{17}$, $(CH_2)_3O$—, $(CH_2)_3OCH_2C_6H_5$, $(CH_2)_3OC_2H_4C_6H_5$, $(CH_2)_3OC_6H_5$,

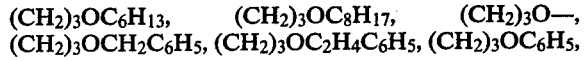

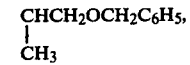

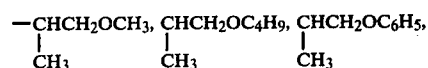

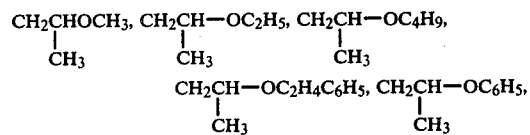

and

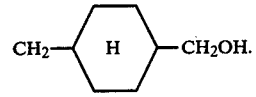

2. Substituted or unsubstituted cycloalkyl and polycycloalkyl radicals:

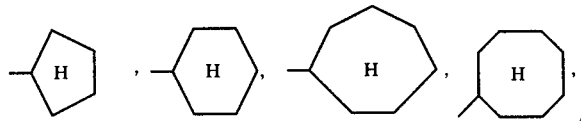

4,154,577

-continued

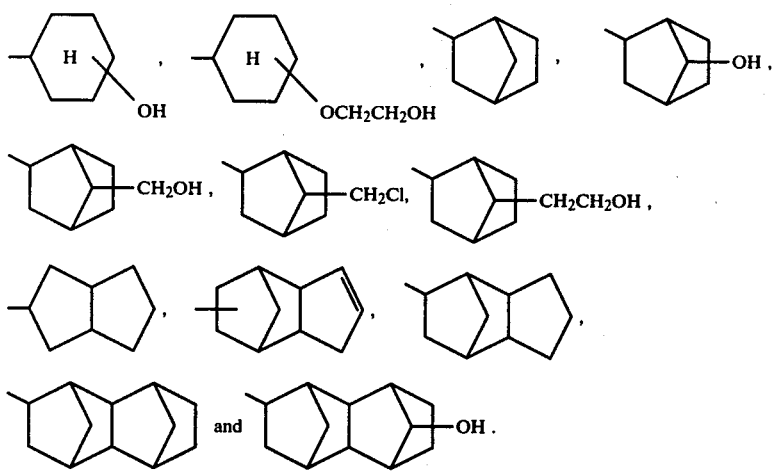

3. Aralkyl radicals:
CH$_2$C$_6$H$_5$, C$_2$H$_4$C$_6$H$_5$,

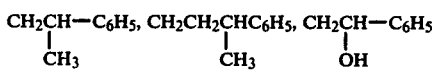

and the corresponding radicals with C$_6$H$_4$CH$_3$ in place of C$_6$H$_5$.

4. The radicals:
CH$_2$CH=CH$_2$, CH$_2$COOCH$_3$, (CH$_2$)$_5$COOCH$_3$, (CH$_2$)$_5$COOC$_2$H$_5$, (CH$_2$)$_5$COOC$_4$H$_9$,

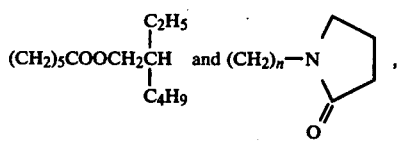

where n is 2, 3, 4 or 6.

5. Acyloxy radicals:
(CH$_2$)$_2$OCHO, (CH$_2$)$_2$OCOCH$_3$, (C$_2$H$_4$O)$_2$CHO, (C$_2$H$_4$O)$_2$COCH$_3$, (CH$_2$)$_2$OCOC$_3$H$_7$,

(CH$_2$)$_2$OCOC$_6$H$_5$, (CH$_2$)$_2$OCOC$_6$H$_4$CH$_3$, (CH$_2$)$_2$OCOC$_6$H$_4$Cl, (CH$_2$)$_2$OCOC$_{10}$H$_7$, (CH$_2$)$_2$OCONHCH$_3$, (CH$_2$)$_2$OCONHC$_4$H$_9$,

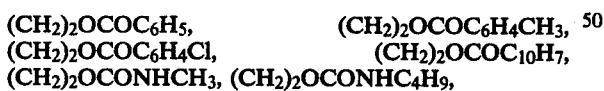

(CH$_2$)$_2$OCONHC$_6$H$_5$, (CH$_2$)$_2$OCONHC$_6$H$_4$Cl, (CH$_2$)$_2$OCONHC$_6$H$_3$Cl$_2$, and the corresponding radicals with (CH$_2$)$_3$, (CH$_2$)$_4$ or (CH$_2$)$_6$ in place of (CH$_2$)$_2$.

6. Acyl radicals:
CHO, CH$_3$CO, C$_2$H$_5$CO, C$_3$H$_7$CO,

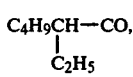

C$_2$H$_5$CO, CH$_3$C$_6$H$_4$CO, C$_6$H$_5$CH$_2$CO, C$_6$H$_5$OCH$_2$CO, CH$_3$SO$_2$, C$_2$H$_5$SO$_2$, C$_6$H$_5$SO$_2$ and CH$_3$C$_6$H$_4$SO$_2$.

Examples of preferred substituents are:
n- and i-C$_3$H$_7$, n- and i-C$_4$H$_9$, C$_6$H$_{13}$, CH$_2$CH$_2$OH, (CH$_2$)$_3$OH,

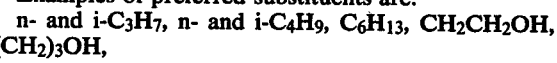

(CH$_2$)$_4$OH, (CH$_2$)$_6$OH,

(CH$_2$)$_2$O(CH$_2$)$_2$OH, (CH$_2$)$_3$O(CH$_2$)$_2$OH, (CH$_2$)$_3$O(CH$_2$)$_4$OH, (CH$_2$)$_3$O(CH$_2$)$_6$OH,

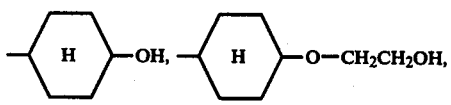

(where n is 2, 3 or 6), CH$_2$CH$_2$OCH$_3$, CH$_2$CH$_2$OC$_2$H$_5$, CH$_2$CH$_2$OC$_4$H$_9$, (CH$_2$)$_3$OCH$_3$, (CH$_2$)$_3$OC$_2$H$_5$, (CH$_2$)$_3$OC$_3$H$_7$, (CH$_2$)$_3$OC$_4$H$_9$,

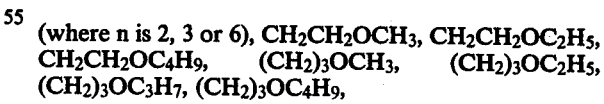

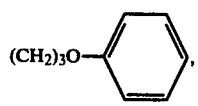

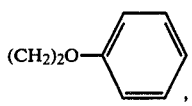, (CH$_2$)$_3$OC$_2$H$_4$OCH$_3$, (CH$_2$)$_3$OC$_2$H$_4$OC$_4$H$_9$,
(CH$_2$)$_3$OC$_2$H$_4$OC$_6$H$_5$,

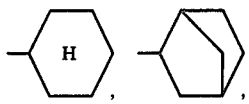,

CH$_2$C$_6$H$_5$, C$_2$H$_4$C$_6$H$_5$ and

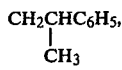

The dyes of the formula I may be prepared by reacting a diazo compound of an amine of the formula II

D—NH$_2$  II with a coupling component of the formula III

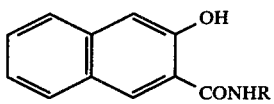 III where D and R have the above meanings.

The amines are diazotized in the conventional manner. The coupling reaction is also carried out in the conventional manner in an aqueous medium, in the presence or absence of solvents, the pH of the mixture ranging from strongly acid to weakly acid.

The dyes of the formula I may also be prepared by reacting an acid chloride of the formula IV

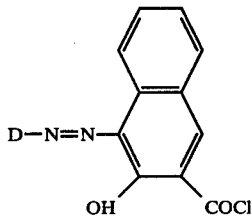 IV with an amine of the formula V

H$_2$N—R  V where D and R have the above meanings. The reactions may be carried out in the organic solvents conventionally used for this process, or in water, with or without heating. An excess of amine, sodium carbonate or sodium hydroxide can serve as the acid-binding agent.

The invention in particular relates to fibers which have been dyed with a dye of formula I in which D is phenyl which is substituted by cyano, trifluoromethyl, methyl, fluorine, chlorine, bromine, alkylsulfonyl of 1 to 4 carbon atoms, phenylsulfonyl, 1,2,4-oxdiazolyl,

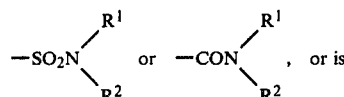

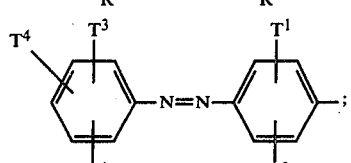

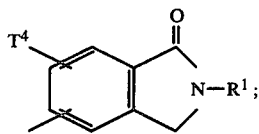

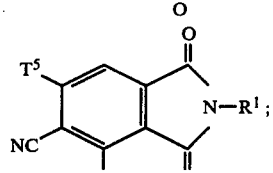

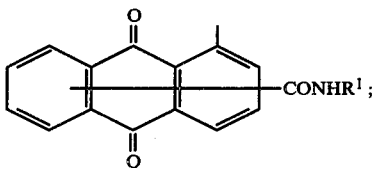

anthraquinonyl which is unsubstituted or substituted by methyl, chlorine, bromine or carboxyl; or benzisothiazolyl substituted by nitro, chlorine or bromine;

R and R$^1$ independently of one another are alkyl of 1 to 8 carbon atoms or are alkyl of 2 to 8 carbon atoms which is substituted by hydroxyl, alkoxy of 1 to 8 carbon atoms, phenoxy, tolyloxy, cyclohexyloxy, benzyloxy, β-phenylethoxy, carboxyl, carboxylate ester of a total of 2 to 9 carbon atoms, C-Acyloxy of a total of 1 to 11 carbon atoms, alkylaminocarbonyloxy (where alkyl is of 1 to 8 carbon atoms), phenylaminocarbonyloxy, tolylaminocarbonyloxy, chlorophenylaminocarbonyloxy, dichlorophenylaminocarbonyloxy or pyrrolidonyl, or are cyclohexyl, norbornyl, phenylalkyl (where alkyl is of 1 to 4 carbon atoms), tolylalkyl (where alkyl is of 1 to 4 carbon atoms), β-phenyl-β-hydroxyethyl, CH$_2$CH$_2$OCH$_2$CH$_2$OH or (CH$_2$)$_3$(OC$_2$H$_4$)$_n$OB, R$^1$ may also be hydrogen, or phenyl which is unsubstituted or substituted by fluorine, chlorine, bromine, methyl, trifluoromethyl, ethyl, methoxy, ethoxy or pyrrolidonyl, R$^2$ is hydrogen or C$_1$ to C$_4$ alkyl optionally substituted by hydroxy or C$_1$ to C$_4$ alkoxy, n is 0, 1 or 2, B is hydrogen, alkyl of 1 to 4 carbon atoms, cyclohexyl, benzyl, phenylethyl, phenyl or tolyl, T$^1$ is hydrogen, chlorine, bromine, methyl, methoxy or ethoxy, T$^2$ is hydrogen, methyl, methoxy or ethoxy, T$^3$ is hydrogen, chlorine, bromine, cyano, nitro, methylsulfonyl,

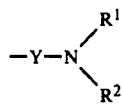

or COOB¹,

B¹ is hydrogen, alkyl of 1 to 8 carbon atoms, phenylalkyl (where alkyl is of 1 to 4 carbon atoms) or $(OC_2H_4)_nOB$, Y is $-SO_2-$ or $-CO-$, T⁴ is hydrogen, chlorine or bromine, T⁵ is hydrogen, methyl or ethyl and R¹ and R² together with the nitrogen are pyrrolidino, piperidino, morpholino or hexamethyleneimino.

Dyes of particular industrial value are those which correspond to the formula Ia

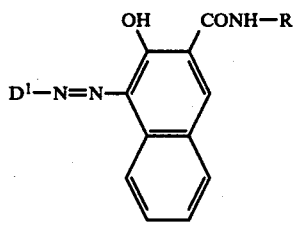

where D¹ is a diazo component derived from the benzene, phthalimide, naphthalimide, anthraquinone or azobenzene series or is a nitrobenzisothiazolyl radical.

Examples of preferred substituents R are:

$CH_2CH_3$, $(CH_2)_2CH_3$, $(CH_2)_3CH_3$, $CH(CH_3)CH_2CH_3$, $CH_2CH(CH_3)_2$, $C(CH_3)_3$, $(CH_2)_4CH_3$, $(CH_2)_2CH(CH_3)_2$, $C(CH_3)_2CH_2CH_3$, $(CH_2)_5CH_3$, $CH_2CH(CH_2CH_3)_2$, $CH(CH(CH_3)_2)_2$, $(CH_2)_7CH_3$, $CH_2CH(C_2H_5)(CH_2)_3CH_3$, $(CH_2)_{11}CH_3$, $(CH_2)_{12}CH_3$, $(CH_2)_{17}CH_3$, $(CH_2)_2OCH_3$, $(CH_2)_3OCH_3$, $(CH_2)_3OC_2H_5$, $(CH_2)_2O(CH_2)_2CH_3$, $(CH_2)_2OCH(CH_3)_2$, $(CH_2)_3OCH(CH_3)_2$, $(CH_2)_3O(CH_2)_2OC_4H_9$, $(CH_2)_3OCH_2CH(C_2H_5)(CH_2)_3CH_3$, $(CH_2)_3OCH_2C_6H_5$, $(CH_2)_3O(CH_2)_2C_6H_5$, $(CH_2)_3O(CH_2)_2C_6H_4-p-Cl$, $(CH_2)_3O(CH_2)_2O(CH_2)_2OC_6H_5$, $(CH_2)_2OC_6H_5$, $(CH_2)_2OH$, $(CH_2)_3OH$, $CH_2CHOHCH_3$, $(CH_2)_2O(CH_2)_2OH$, $C(CH_3)_2CH_2OH$, $(CH_2)_3O(CH_2)_4OH$, $C(CH_2OH)_3$, $(CH_2)_8CH=CH(CH_2)_7OH$,

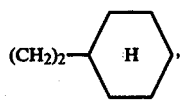

$(CH_2)_2OCOC_6H_5$, $(CH_2)_3OCOC_6H_5$, $(CH_2)_3OC_2H_4OCOC_6H_5$, $(CH_2)_3O(CH_2)_4OCOC_6H_5$, $(CH_2)_2OCONHC_6H_5$, $(CH_2)_3OCONHC_6H_5$, $(CH_2)_3OCONHC_6H_4Cl$, $(CH_2)_3O(CH_2)_2OCONHC_6H_5$ and $CH_2CH=CH_2$.

Specifically, the radical D¹ may be derived from, for example, the following amines: o-, m- and p-cyanoaniline, 2,4-dicyanoaniline, 2,4,6-tribromoaniline, 2,4-dichloroaniline, 2-cyano-4,6-dibromoaniline, 2,4-dicyano-6-bromoaniline, 4-cyano-2-chloroaniline, 1-amino-2-trifluoromethyl-4-chlorobenzene, 2-chloro-5-aminobenzonitrile, 2-amino-5-chlorobenzonitrile, 1-aminobenzene-4-methylsulfone, 1-amino-2,6-dibromobenzene-4-methylsulfone, 1-amino-2-chloro-4-methylsulfone, 1-amino-2,6-dichlorobenzene-4-methylsulfone, 3,5-dichloroanthranilic acid propyl ester, 3,5-dibromoanthranilic acid β-methoxyethyl ester, 4-aminoacetophenone, 4- and 2-aminobenzophenone, 2- and 4-aminodiphenylsulfone, the β-hydroxyethylimide, phenylimide and p-tolylimide of 3- and 4-aminophthalic acid, 3-amino-6-chlorophthalimide and its N-substitution products, 3-amino-4-cyano-5-methyl- and -ethyl-phthalimide and their N-substitution products, 1-aminoanthraquinone, 1-amino-2-chloroanthraquinone, 1-amino-2-bromoanthraquinone, 1-amino-2,4-dibromoanthraquinone, 1-amino-2-acetyl-4-chloroanthraquinone, 1-aminoanthraquinone-6-carboxylic acid, 1-aminoanthraquinone-6-carboxylic acid ethyl ester, 1-amino-4-methoxyanthraquinone, 1-amino-4-hydroxyanthraquinone, 1-amino-2-chloro-4-p-toluidinoanthraquinone, 2-amino-1-chloroanthraquinone, 2-amino-3-chloroanthraquinone, 2-amino-3-bromoanthraquinone, 2-amino-1,3-dibromoanthraquinone, 2-amino-1-cyano-3-bromoanthraquinone, 1-, 6- and 7-amino-benzanthrone, 2-aminoanthraquinone, 1-amino-4-chloroanthraquinone, 2,4-dicyano-3,5-dimethylaniline, 4-aminonaphthalic acid imide, methylimide, n-butylimide, 2-hydroxy-ethylimide, 3'-methoxypropylimide and phenylimide, 5-nitro-3-amino-2,1-benzisothiazole and 5-nitro-7-bromo-3-amino-2,1-benzisothiazole.

Examples of suitable diazo components of the aminoazobenzene series are: 4-aminoazobenzene, 3-chloro-4-aminoazobenzene, 3-bromo-4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminobenzene, 2-methyl-4',5-dimethoxy-4-aminoazobenzene, 4'-chloro-2-methyl-5-methoxy-4-aminobenzene, 4'-chloro-2-methyl-4-aminoazobenzene, 2,5-dimethoxy-4-aminoazobenzene, 4'-chloro-2,5-dimethoxy-4-aminoazobenzene, 4'-chloro-2,5-dimethyl-4-aminobenzene, 4'-methoxy-2,5-dimethyl-4-aminoazobenzene, 3,5-dibromo-4-aminoazobenzene, 2,3'-dichloro-4-aminoazobenzene, 3-methoxy-4-aminoazobenzene, 2',3-dimethyl-5-bromo-4-azobenzene, 4'-amino-2',5'-dimethylazobenzene-4-sulfonamide and -3-sulfonamide and the aminoazobenzenes of the formula

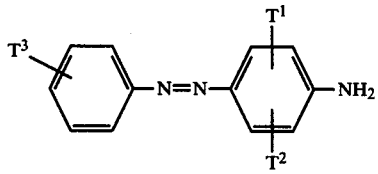

where T¹ is hydrogen, chlorine, bromine or methyl, T² is hydrogen or methyl and T³ is a radical of the formula

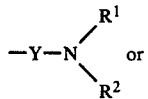

COOB¹, where Y is $-CO-$ or $-SO_2-$ and B¹ is an alcohol radical, and R¹ and R² have the stated meanings.

From the point of view of their structure, the dyes of the formula I can be described as disperse dyes which, as a rule, cannot be applied to, for example, cotton. However, U.S. Pat. No. 3,706,525 which is incorporated herein by reference, discloses a process which permits printing such dyes on cellulose and cellulosecontaining textile material. The general principle of the disclosures in the said patent in respect of process conditions also apply to the dyes of formula I. Further, German Laid-Open Applications Nos. 25 24 243 and 25 28 743 disclose other processes by means of which the dyes of formula I can be applied. Amongst these, printing processes are preferred.

The dyes of formula I give dyeings and prints with excellent fastness properties, amongst which the fastness to wet treatments and in some cases also the lightfastness should be singled out. For example, when prints are washed, there is no staining of any white ground which may be present.

Some of the dyes of the formula I may also be used as disperse dyes for polyesters.

For application, the dyes of formula I are usually converted into formulations: In addition to the dyes of the formula I, these formulations contain dispersants, water-retaining agents and water, with or without other components conventionally used in dye formulations, eg. disinfectants or anti-foam agents.

Cationic compounds may be used as the dispersants, but non-ionic compounds and, in particular, anionic compounds, i.e. the dispersants conventionally used for disperse dyes, are preferred. Specific examples are ligninsulfonates, sulfomethylation products of phenol, condensation products of phenolsulfonic acids, phenol, formaldehyde and urea, condensation products of β-sulfonaphthalene and formaldehyde, and polyadducts of propylene oxide with ethylene glycol, propylene glycol or ethylenediamine.

Water-retaining agents are, in particular, glycols and glycol ethers, eg. ethylene glycol, propylene glycol, diethylene glycol and ethylene glycol monomethyl ether.

In the Examples which follow, parts and percentages are by weight, unless stated otherwise.

EXAMPLE 1

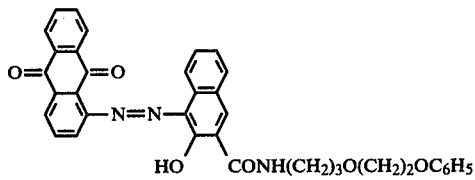

HO   CONH(CH$_2$)$_3$O(CH$_2$)$_2$OC$_6$H$_5$

The azo dye obtained by coupling diazotized 1-aminoanthraquinone with β-hydroxynaphthoic acid is converted to the acid chloride by reaction with thionyl chloride (for example as described in German Laid-Open Application DOS No. 2,520,896, Example 1). A mixture of 22 parts of this azo dye-carboxylic acid chloride and 19.5 parts of phenoxyethoxypropylamine in 100 parts by volume of toluene is stirred for 5 hours at room temperature. The precipitate which crystallizes out from the red solution is filtered off, washed with methanol and dried. 20 parts of a red dye of the stated structure are obtained. The melting point is 188°–189° C.

A cotton fabric is printed by rotary screen printing with an ink which comprises 10 parts of the above dye, 100 parts of polyethylene glycol of molecular weight 300 and 790 parts of a 3% strength alginate thickener, and the print is dried at 100° C. It is then treated with hot air at 200° C. for 1 minute, rinsed cold, soaped at the boil, again rinsed cold and dried. A lightfast and washfast red print on a white ground is obtained.

EXAMPLE 2

19.5 parts of phenoxyethoxypropylamine are added to a suspension of 22 parts of the azo dye-carboxylic acid chloride described in Example 1, in 100 parts by volume of water, and the mixture is stirred for 12 hours at room temperature. The red precipitate is then filtered off, washed with water and dried. 29 parts of the dye described in Example 1 are obtained.

EXAMPLE 3

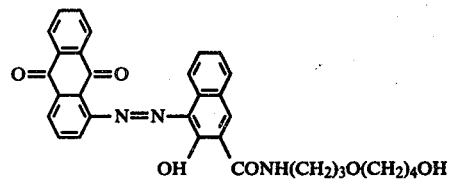

OH   CONH(CH$_2$)$_3$O(CH$_2$)$_4$OH 22 parts of the azo dye-carboxylic acid chloride are reacted with 14.7 parts of hydroxybutoxypropylamine in 100 parts by volume of o-dichlorobenzene, by the method described in Example 1. 16 parts of azo dye of the above structure are obtained; this compound dyes polyethylene terephthalate fabrics, by the conventional dyeing methods, in red hues having very good lightfastness and fastness to thermofixation.

An ink prepared from this dye as described in Example 1 gives a lightfast and washfast red print on cotton or cotton/polyester union fabric if applied by rotary screen printing.

The Examples of azo dyes listed below are prepared by the methods described in the preceding Examples.

D—N=N—

OH   CONHR

| Example | D | R | Hue on cotton |
|---|---|---|---|
| 4 | anthraquinonyl | CH$_2$CH$_3$ | red |
| 5 | " | (CH$_2$)$_2$CH$_3$ | " |
| 6 | " | (CH$_2$)$_3$CH$_3$ | " |
| 7 | " | CH(CH$_3$)CH$_2$CH$_3$ | yellowish red |

-continued

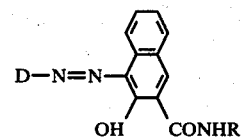

| Example | D | R | Hue on cotton |
|---|---|---|---|
| 8 | " | $CH_2CH(CH_3)_2$ | red |
| 9 | " | $C(CH_3)_3$ | " |
| 10 | " | $(CH_2)_4CH_3$ | " |
| 11 | " | $(CH_2)_2CH(CH_3)_2$ | " |
| 12 | " | $C(CH_3)_2CH_2CH_3$ | " |
| 13 | " | $(CH_2)_5CH_3$ | " |
| 14 | " | $CH_2CH(CH_2CH_3)_2$ | yellowish red |
| 15 | " | $CH(CH(CH_3)_2)_2$ | red |
| 16 | " | $(CH_2)_7CH_3$ | " |
| 17 | " | $CH_2CH(C_2H_5)(CH_2)_3CH_3$ | " |
| 18 | " | $(CH_2)_{11}CH_3$ | " |
| 19 | " | $(CH_2)_{12}CH_3$ | " |
| 20 | " | $(CH_2)_{17}CH_3$ | " |
| 21 | " | $-(CH_2)_2OCH_3$ | " |
| 22 | " | $-(CH_2)_3OCH_3$ | " |
| 23 | " | $-(CH_2)_3OC_2H_5$ | " |
| 24 | " | $-(CH_2)_2O(CH_2)_2CH_3$ | " |
| 25 | " | $-(CH_2)_2OCH(CH_3)_2$ | " |
| 26 | " | $-(CH_2)_3OCH(CH_3)_2$ | " |
| 27 | " | $-(CH_2)_3OCH_2CH(C_2H_5)(CH_2)_3CH_3$ | " |
| 28 | " | $-(CH_2)_3OCH_2C_6H_5$ | " |
| 29 | " | $-(CH_2)_3O(CH_2)_2C_6H_5$ | " |
| 30 | " | $-(CH_2)_3O(CH_2)_2OC_6H_5$ | " |
| 31 | " | $-(CH_2)_3O(CH_2)_2OC_6H_4\text{-p-Cl}$ | " |
| 32 | " | $-(CH_2)_3O(CH_2)_2O(CH_2)_2OC_6H_5$ | " |
| 33 | " | $-(CH_2)_2OC_6H_5$ | " |
| 34 | " | $-CH_2CHOHCH_3$ | " |
| 35 | " | $-(CH_2)_3O(CH_3)_4OH$ | " |
| 36 | " | $-(CH_2)_2O(CH_2)_2OH$ | " |
| 37 | " | $-C(CH_3)_2CH_2OH$ | " |
| 38 | " | $-(CH_2)_3OH$ | " |
| 39 | " | $-(CH_2)_8CH=CH(CH_2)_7OH$ | " |
| 40 | " | $-C(CH_2OH)_3$ | " |
| 41 | " | $-(CH_2)_2OH$ | " |
| 42 | " | $-(CH_2)_2-\langle H \rangle$ | " |
| 43 | " | $-\langle H \rangle$ | " |
| 44 | " | $-\langle H \rangle\ CH_3$ | " |
| 45 | " | $CH_2-\langle O \rangle$ | " |
| 46 | " | $CH(CH_3)(CH_2)_2OCH_3$ | " |
| 47 | " | $(CH_2)_3(O(CH_2)_2)_2OC_2H_5$ | " |
| 48 | " | $(CH_2)_3(O(CH_2)_2)_2OC_4H_9$ | " |
| 49 | " | $CH_2CH=CH_2$ | " |
| 50 | " | $(CH_2)_3OCOC_6H_5$ | " |
| 51 | " | $(CH_2)_3OCOCH_3$ | " |
| 52 | " | $(CH_2)_3O(CH_2)_4OCOC_6H_5$ | " |

EXAMPLE 53

202 parts of 2-hydroxynaphthalene-3-carboxylic acid methyl ester are introduced into 430 parts of phenoxyethoxypropylamine at room temperature, whilst stirring. This mixture is heated to 120° C. and is stirred at this temperature until starting material is no longer detectable in a thin layer chromatogram. After adding 100 parts of glacial acetic acid, the mixture is made up to 1,600 parts by volume with N-methylpyrrolidone.

EXAMPLE 54

22.3 parts of 1-aminoanthraquinone are introduced into a mixture of 180 parts of 96% strength sulfuric acid and 64 parts of 40% strength nitrosylsulfuric acid at 10°-15° C. After stirring for 4 hours at the same temperature, the mixture is heated to 35° C. and kept at this temperature for 15 minutes.

The mixture is then introduced into a mixture of 600 parts of ice and 200 parts of water. The sparingly soluble diazonium sulfate is filtered off and washed with a little ice water.

The diazonium salt is added in small portions, at 0°–5° C., to a mixture of 160 parts by volume of the solution of the coupling component obtained as described in Example 53 and 2,000 parts by volume of N-methylpyrrolidone, and 200 parts of ice are also added.

After completion of coupling, the azo dye produced is filtered off, washed with alcohol and water and dried at 100° C. A brownish red powder is obtained, which gives a red solution in N-methylpyrrolidone. The dye thus prepared is identical with that obtained as described in Example 1.

The dyes listed below can be obtained by the same process, and using the same coupling component.

| Example | Diazo component | Hue on cotton/ polyester union fabric |
|---|---|---|
| 55 | 1-amino-2-methyl-anthraquinone | red |
| 56 | 1-amino-2-ethyl-anthraquinone | red |
| 57 | 1-amino-2-chloro-anthraquinone | red |
| 58 | 1-amino-2-chloro-4-methyl-anthraquinone | red |
| 59 | 1-amino-2,4-dibromo-anthraquinone | brown |
| 60 | 1-amino-5-benzoylamino-anthraquinone | red |
| 61 | 1-amino-4-benzoylamino-anthraquinone | violet |
| 62 | 1-amino-4-nitro-anthraquinone | red |
| 63 | 2-amino-anthraquinone | red |
| 64 | 2-amino-3-chloro-anthraquinone | red |

EXAMPLE 65

100 parts of a 34% strength aqueous paste of 4'-nitro-2'-chloro-2,5-dimethoxy-4-aminoazobenzene are stirred with 1,000 parts by volume of glacial acetic acid, 20 parts by volume of 10 N hydrochloric acid being added. 30 parts by volume of a 23% strength aqueous sodium nitrite solution are then added gradually to the above mixture at 10°–15° C. Stirring is continued at the same temperature until diazotization is complete.

The diazotized mixture thus obtained is run, at 0°–5° C., into a mixture of 180 parts by volume of the coupling component obtained as described in Example 49 and 4,000 parts by volume of N-methylpyrrolidone. After completion of the reaction, the coupling product is filtered off, washed with alcohol and then with water, and dried at 100° C. A greyish blue powder is obtained, which gives a blue solution in N-methylpyrrolidone. The dye gives very fast navy blue hues on cotton, polyester or cotton/polyester union fabrics.

The dyes shown below can be obtained by the process described in the above Example, and using the same coupling component.

| Ex. | Diazo component | Hue |
|---|---|---|
| 66 | 2-chloro-4-nitro-phenyl-azo-1-aminonaphthalene | navy blue |
| 67 | 2,6-dichloro-4-nitro-phenyl-azo-1-aminonaphthalene | " |
| 68 | 2,5-dichloro-4-nitro-phenyl-azo-2,5-dimethoxy-4-aminobenzene | " |
| 69 | 4-nitro-phenyl-azo-1-aminonaphthalene | " |
| 70 | phenyl-azo-4-aminobenzene | red |
| 71 | phenyl-azo-2-chloro-4-aminobenzene | " |
| 72 | phenyl-azo-3,5-dibromo-4-aminobenzene | " |
| 73 | 2'-chloro-4'-nitro-phenyl-azo-2-methyl-5-methoxy-4-aminobenzene | brownish olive |
| 74 | 3-phenyl-5-(4-aminophenyl)-1,2,4-oxadiazole | orange |

-continued

| Ex. | Diazo component | Hue |
|---|---|---|
| 75 | (2-amino-phenyl fused to N-substituted imide ring, O=C-N(C=O)-, N-substituent = 4-methylphenyl with CH₃) | " |

EXAMPLE 76

30 parts by volume of a 23% strength aqueous sodium nitrite solution are run into a mixture of 26 parts of 1-amino-2-methoxybenzene-5-sulfonic acid diethylamide, 100 parts of water, 15 parts by volume of 10 N hydrochloric acid and 100 parts of ice at 0°–5° C. After stirring for 2 hours at 0°–5° C. and then destroying excess nitrous acid with amidosulfonic acid in the usual manner, the resulting solution of the diazonium salt is run, at 0°–5° C., into a solution of 150 parts by volume of the solution from Example 49 in 2,000 parts by volume of N-methylpyrrolidone, simultaneously with 250 parts by volume of a saturated aqueous sodium acetate solution. The red coupling product is filtered off, washed with water and dried. A red powder is obtained, which gives a red solution in alcohol, DMF or NMP and produces fast red dyeings on polyester by the HT method.

The dyes shown below can be obtained by the method described in the above Example, and using the same coupling component.

| Example | Diazo component | Hue on polyester |
|---|---|---|
| 77 | (CH₃)₂N–SO₂–C₆H₃(NH₂)(OCH₃) | red |
| 78 | C₂H₅–SO₂–C₆H₃(NH₂)(OCH₃) | " |
| 79 | CH₃–SO₂–C₆H₃(NH₂)(OCH₃) | " |
| 80 | C₆H₅–CH₂–SO₂–C₆H₃(NH₂)(OCH₃) | " |
| 81 | 2-aminophenyl with HN–N= (triazole/amidrazone fused) group | " |
| 82 | 2-(phenylsulfonyl)aniline (NH₂, SO₂–C₆H₅) | orange |
| 83 | CH₃–SO₂–C₆H₃(Cl)(NH₂) | " |

| Example | Diazo component | Coupling component | Hue on cotton/polyester union |
|---|---|---|---|

| Example | Diazo component | Coupling component | Hue |
|---|---|---|---|
| 84 | 1-amino-2-methylanthraquinone | OH—naphthalene—CO—NH—C$_6$H$_{13}$-n | red |
| 85 | 1-amino-2-methyl-4-chloroanthraquinone | " | " |
| 86 | 1-amino-2-chloroanthraquinone | " | " |
| 87 | naphthalimide with CH$_3$—O—(CH$_2$)$_3$N and NH$_2$ | " | bluish red |
| 88 | naphthalimide with CH$_3$O(CH$_2$)$_3$—N, Br, NH$_2$ | " | " |
| 89 | phenyl—N=N—(2,4-dibromo-aniline) with NH$_2$, Br, Br | " | red |

| Example | Diazo component | Coupling component | Hue |
|---|---|---|---|
| 90 | phenyl—N=N—(2,4-dibromo-aniline) with NH$_2$, Br, Br | OH—naphthalene—CONH(CH$_2$)$_3$O(CH$_2$)$_4$OH | red |
| 91 | N-phenyl naphthalimide with NH$_2$ | " | bluish red |
| 92 | 1-amino-4-benzoylamino anthraquinone | " | red |
| 93 | 2-amino-phenyl benzoxazole type | " | orange |
| 94 | 4-amino-2,5-dichloro-N,N-dimethylsulfamoylbenzene | OH—naphthalene—NH—cyclohexyl | " |

| | | | |
|---|---|---|---|
| 95 | [structure: 5-amino-N-(3-methoxypropyl)naphthalene-1,8-dicarboximide] | " | bluish red |
| 96 | [structure: 4-(3-bromo-4-aminophenylazo)-N,N-dimethylbenzenesulfonamide] | [structure: 3-hydroxy-2-(cyclohexylamino)naphthalene] | bluish red |
| 97 | [structure: 3-chloro-4-aminoazobenzene] | " | " |
| 98 | " | [structure: 3-hydroxy-2-naphthoic acid n-hexylamide] | " |
| 99 | " | [structure: 3-hydroxy-2-naphthoic acid NH(CH$_2$)$_3$O(CH$_2$)$_4$OH amide] | " |
| 100 | [structure: 2,4-dibromo-6-nitroaniline] | [structure: 3-hydroxy-2-naphthoic acid CONH-(CH$_2$)$_3$-O-(CH$_2$)$_2$-O-phenyl amide] | orange |
| 101 | [structure: 4,5-dichloro-2-nitroaniline] | " | " |
| 102 | [structure: 4-chloro-2-nitroaniline] | " | " |
| 103 | [structure: 4-methoxy-2-nitroaniline] | [structure: 3-hydroxy-2-naphthoic acid cyclohexylamide] | red |
| 104 | [structure: 2-nitroaniline] | [structure: 3-hydroxy-2-naphthoic acid NH-C$_2$H$_4$-C$_6$H$_{11}$ amide] | orange |
| 105 | [structure: 4-methyl-2-nitroaniline] | " | " |
| 106 | [structure: 4-chloro-2-nitroaniline] | " | " |
| 107 | [structure: 4-methoxy-2-nitroaniline] | " | red |

| | | | |
|---|---|---|---|
| 108 | 2-nitro-4-ethoxyaniline | " | " |
| 109 | 2-nitro-4-methoxy-6-chloroaniline | " | " |
| 110 | 2-nitroaniline | 3-hydroxy-N-benzyl-2-naphthamide | orange |
| 111 | 2-nitro-4-methylaniline | 3-hydroxy-N-benzyl-2-naphthamide | " |
| 112 | 2-nitro-4-chloroaniline | " | yellowish red |
| 113 | 2-nitro-4-methoxyaniline | " | red |
| 114 | 2-nitro-4-ethoxyaniline | " | " |
| 115 | 2-nitroaniline | 3-hydroxy-N-cyclohexyl-2-naphthamide | orange |
| 116 | 2-nitro-4-chloroaniline | " | " |
| 117 | 2-nitro-4-methylaniline | " | " |
| 118 | 2-nitro-4-methoxyaniline | " | red |
| 119 | 2-nitro-4-ethoxyaniline | 3-hydroxy-N-cyclohexyl-2-naphthamide | red |
| 120 | 2-nitroaniline | 3-hydroxy-N-(2-phenylpropyl)-2-naphthamide (HO–naphthyl–CO–NH–CH$_2$–CH(CH$_3$)–C$_6$H$_5$) | orange |
| 121 | 2-nitro-4-methylaniline | " | orange |
| 122 | 2-nitro-4-chloroaniline | " | orange |

-continued
| | | | |
|---|---|---|---|
| 123 | 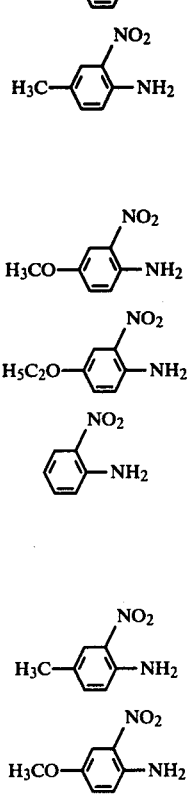 | " | red |
| 124 | 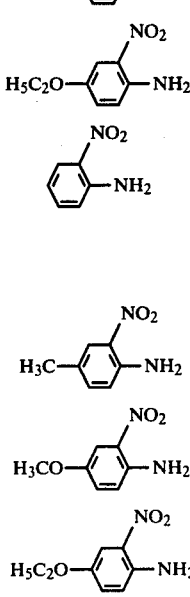 | " | red |
| 125 | 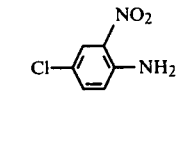 | 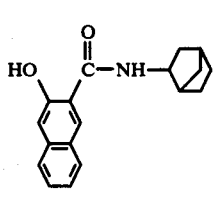 | orange |
| 126 | 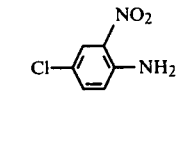 | " | red |
| 127 | 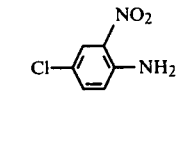 | " | red |
| 128 | 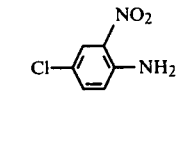 | 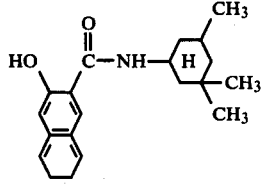 | orange |
| 129 | 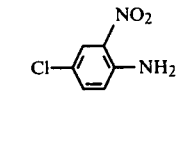 | " | orange |
| 130 | 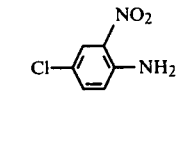 | " | red |
| 131 | 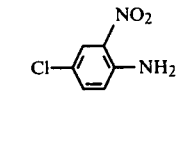 | " | red |
| 132 | 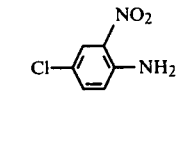 | 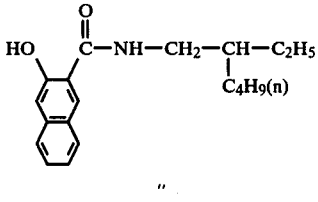 | orange |
| 133 | 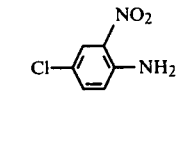 | " | orange |
| 134 | 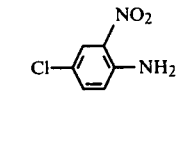 | " | red |
| 135 | 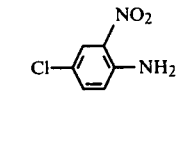 | " | red |
| 136 | 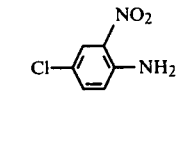 | 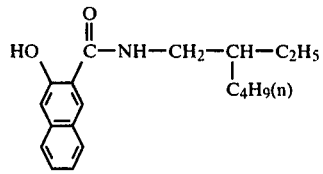 | orange |

| 137 | " | 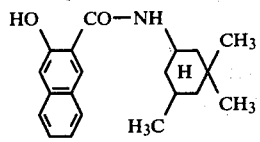 | orange |

We claim:

1. Uniformly dyed water-swellable cellulosic fibers, wherein said fibers are fast to washing and to light and having been produced by contacting water-swellable cellulosic fibers sequentially or concomitantly with water, ethylene glycol or a derivative thereof and while said fibers are still swollen said fibers are dyed with an essentially water-insoluble dye of the formula

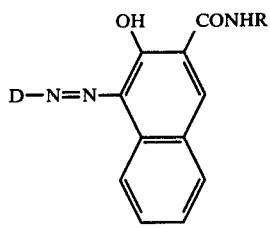

in which

D is anthraquinonyl-1;

R is alkyl of 1 to 18 carbon atoms or is alkyl of 2 to 8 carbon atoms which is substituted by hydroxyl, alkoxy of 1 to 8 carbon atoms, phenoxy, tolyloxy, cyclohexyloxy, benzyloxy, β-phenylethoxy, carboxyl, carboxylate ester of a total of 2 to 9 carbon atoms, C-acyloxy of a total of 1 to 11 carbon atoms, alkylaminocarbonyloxy (where alkyl is of 1 to 8 carbon atoms), phenylaminocarbonyloxy, tolylaminocarbonyloxy, chlorophenylaminocarbonyloxy, dichlorophenylaminocarbonyloxy or pyrrolidonyl, or is cyclohexyl, cyclohexylethyl, norbornyl, phenylalkyl (where alkyl is of 1 to 4 carbon atoms), tolylalkyl (where alkyl is of 1 to 4 carbon atoms), β-phenyl-β-hydroxyethyl, $CH_2CH_2OCH_2CH_2OH$ or $(CH_2)_3(OC_2H_4)_nOB$, n is 0, 1 or 2, B is hydrogen, alkyl of 1 to 4 carbon atoms, cyclohexyl, benzyl, phenylethyl, phenyl or tolyl.

2. The fibers according to claim 1 where

R is $C_2$ to $C_{18}$ alkyl; $C_2$ to $C_8$ alkyl substituted by hydroxy, $C_1$ to $C_8$ alkoxycarbonyl; $C_1$ to $C_8$ alkoxy, phenoxy, benzyloxy, phenylethoxy, cyclohexyloxy, $C_1$ to $C_8$ alkanoyloxy or benzoyloxy; cyclohexyl; cyclohexylethyl; phenyl-$C_1$ to $C_4$-alkyl; β-phenyl-β-hydroxyethyl; $CH_2CH_2OCH_2CH_2OH$ or $(CH_2)_3(OCH_2CH_2)_nOB$; where B is hydrogen, $C_1$ to $C_4$ alkyl, cyclohexyl, benzyl, phenylethyl, phenyl or phenyl substituted by methyl and n is 1 or 2.

3. The fibers according to claim 2 where

R is $C_3$ to $C_{13}$ alkyl, $C_2$ to $C_8$ alkyl substituted by $C_2$ to $C_8$ alkoxy or $(CH_2)_3(OCH_2CH_2)_nOB$.

4. The fibers according to claim 3 where n is 1 and B phenyl or tolyl.

5. The fibers according to claim 1 where

R is $(CH_2)_3OC_2H_4OC_6H_5$, $(CH_2)_3OC_2H_4C_6H_5$ or

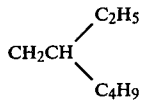

6. The fibers according to claim 1, wherein said cellulosic fiber is cotton.

7. The fibers according to claim 1, wherein the cellulosic fiber is cotton mixed with polyester fibers.

* * * * *